US008745181B2

(12) United States Patent
Yuengling et al.

(10) Patent No.: US 8,745,181 B2
(45) Date of Patent: Jun. 3, 2014

(54) GENERIC SNMP INFORMATION COLLECTION

(75) Inventors: Stephen Paul Yuengling, Durham, NC (US); Sharon Chisholm, Ottawa (CA); April Pennisi, Raleigh, NC (US)

(73) Assignee: Rockstar Consortium US LP, Plano, TX (US)

( * ) Notice: Subject to any disclaimer, the term of this patent is extended or adjusted under 35 U.S.C. 154(b) by 2841 days.

(21) Appl. No.: 11/313,898

(22) Filed: Dec. 21, 2005

(65) Prior Publication Data

US 2007/0156711 A1     Jul. 5, 2007

(51) Int. Cl.
 *G06F 15/173* (2006.01)
(52) U.S. Cl.
 USPC ............... 709/223; 709/207; 709/220
(58) Field of Classification Search
 USPC .................................. 709/220, 223
 See application file for complete search history.

(56) References Cited

U.S. PATENT DOCUMENTS

| | | | | |
|---|---|---|---|---|
| 5,864,865 A * | 1/1999 | Lakis | ................... | 707/103 R |
| 5,903,731 A * | 5/1999 | Vincent et al. | ............. | 709/226 |
| 5,913,037 A | 6/1999 | Spofford et al. | | |
| 6,094,672 A * | 7/2000 | Willie et al. | ................. | 709/202 |
| 6,134,615 A * | 10/2000 | Chari et al. | ................... | 710/302 |
| 6,275,853 B1 | 8/2001 | Beser et al. | | |
| 6,317,748 B1 * | 11/2001 | Menzies et al. | ............ | 707/103 X |
| 6,363,391 B1 * | 3/2002 | Rosensteel, Jr. | ........................ | 1/1 |
| 6,697,970 B1 * | 2/2004 | Chisholm | ...................... | 714/48 |
| 6,728,768 B1 | 4/2004 | Carney | | |
| 6,981,038 B2 * | 12/2005 | McKenzie et al. | ............ | 709/223 |
| 7,099,931 B2 * | 8/2006 | Da Palma et al. | ............. | 709/220 |
| 7,143,156 B2 * | 11/2006 | Menzies et al. | ............... | 709/223 |
| 7,395,325 B2 * | 7/2008 | Ohara | ............................ | 709/223 |
| 7,430,594 B2 * | 9/2008 | Krupczak | ....................... | 709/223 |
| 7,447,767 B2 * | 11/2008 | Chevanne et al. | ............. | 709/224 |
| 7,555,743 B2 * | 6/2009 | Sridhar et al. | ................. | 717/106 |
| 7,668,953 B1 * | 2/2010 | Sinclair et al. | ................. | 709/224 |
| 2002/0161935 A1 * | 10/2002 | Blaisdell | ........................ | 709/331 |
| 2003/0115316 A1 * | 6/2003 | Yang-Huffman | ............. | 709/224 |
| 2003/0208574 A1 * | 11/2003 | Chen et al. | ..................... | 709/223 |
| 2004/0039808 A1 * | 2/2004 | Ohara | ............................ | 709/223 |
| 2004/0122922 A1 * | 6/2004 | Da Palma et al. | ............. | 709/223 |

(Continued)

FOREIGN PATENT DOCUMENTS

EP     1347598 B1     9/2003

OTHER PUBLICATIONS

Simple Network Management Protocol, Cisco Systems Inc., Aug. 15, 2003, chapter 56, pp. 1-12.

(Continued)

*Primary Examiner* — B. Tiv
(74) *Attorney, Agent, or Firm* — Withrow & Terranova, PLLC

(57) ABSTRACT

The present invention provides a technique to define objects and object instances in a dynamically modifiable table within the confines of a management information base definition. With the invention, new objects and object instances may be added to the table without changing the management information base definition at a managed device or network management system. The managed device can change the table, yet allow the network management system to access the table using an associated object identifier. The network management system can systematically step through the various objects or object instances, which may correspond to rows and columns of the table, to detect additions or modifications to the table. The various objects and object instances in the table may be individually accessed, once identified, using a unique object identifier.

18 Claims, 8 Drawing Sheets

(56) References Cited

U.S. PATENT DOCUMENTS

| | | |
|---|---|---|
| 2004/0153966 A1* | 8/2004 | Richmond et al. ............ 715/509 |
| 2004/0221041 A1* | 11/2004 | Tabbara ........................ 709/227 |
| 2007/0156711 A1* | 7/2007 | Yuengling et al. ............ 707/100 |

OTHER PUBLICATIONS

Packeteer SNMP User Guide, Packeteer Inc., Dec. 2001, Chapters 1-6.

International Search Report for PCT/IB2006/003720, mailed Jun. 26, 2007.

Extended European Search Report for EP Appl. No. 06831777.5, mailed Nov. 5, 2009.

J. Won-Ki Hong, "Internet Network Management," Jun. 4, 2000, retrieved from Internet on Oct. 19, 2009, <http://dpnm.postech.ac.kr/cs637/lecture/internet-nm.ppt>.

European Patent Office Official Action, mailed Feb. 9, 2011.

European Examination Report for European Application No. 06831777.5-1862, mailed Apr. 16, 2013, 6 pages.

* cited by examiner

| PERFORMANCE TABLES (3) ||||||
| INDEX / ENTRY | NAME (1) | GROUP (2) | DATA TYPE (3) | SOURCE (4) | VALUE (5) |
| --- | --- | --- | --- | --- | --- |
| 1 | | | | | |
| 2 | | | | X | |
| 3 | | | | | |
| 4 | | | | | |

OID FOR X = 1.4.6.1.4.1.8.3.2.4

*FIG. 4*

| PERFORMANCE TABLES (3) | | | | | |
|---|---|---|---|---|---|
| INDEX / ENTRY | NAME (1) | GROUP (2) | DATA TYPE (3) | SOURCE (4) | VALUE (5) |
| 1 | | | | | |
| 2 | | | | | |
| 3 | | | | | |
| 4 | | | | | |
| 5 | | | | | |
| 6 | | | | | Y |

NEW ENTRIES { 5, 6 }

OID FOR Y = 1.4.6.1.4.1.8.3.6.5

*FIG. 6*

GENERIC SNMP INFORMATION COLLECTION

FIELD OF THE INVENTION

The present invention relates to communications, and in particular to providing a more flexible technique for collecting information using the Simple Network Management Protocol (SNMP).

BACKGROUND OF THE INVENTION

The Simple Network Management Protocol (SNMP) was developed to manage various elements in the Internet and attached networks. SNMP uses a manager and agent architecture, wherein each managed device runs an agent from which the manager can obtain information that is provided to facilitate remote management. As illustrated in FIG. 1, an SNMP communication environment 10 is illustrated as having a network management system (NMS) 12 adapted to manage any number of managed devices (MDs) 14, which may represent any type of network element such as personal computers, servers, routers, switches, and the like. The NMS 12 provides a human interface for the overall management system, and is able to communicate with the various managed devices 14. The managed devices 14 each provide an agent 18, which provides an interface between the NMS 12 and the managed device 14 to be managed.

To facilitate management of the managed devices 14, the NMS 12 and the managed devices 14 will use a management information base (MIB) 20 and a small set of commands to exchange information. The MIB 20 is organized in a tree structure, with numerous objects represented at the end of each branch. Each object may be associated with one or more object instances, such as metrics, labels, or other information relevant to managing the network or the managed device 14. The object instances may be operational metrics or a function provided by the managed device 14. An object identifier (OID), which is a long numeric tag separated by periods, is used to distinguish each object in the MIB 20 and is used in SNMP messages to identify the object instance or instances corresponding to a given object.

In general, SNMP uses five basic messages to communicate between the NMS 12 and the agent 18 in the managed device 14. These messages include GET, GET NEXT, GET BULK, SET, and TRAP. The GET, GET BULK, and GET NEXT messages allow the NMS 12 to request information or object instances for a specific object or table of objects. The agent 18, upon receiving a GET, GET BULK, or GET NEXT message, will issue a response message to the NMS 12 with either the information requested or an error message indicating why the request could not be fulfilled. The SET message allows the NMS 12 to request a change to be made to an object instance of an object that allows read/write access. The agent 18 may respond with a response message indicating that a change has been made or an indication as to why the change could not be made. The TRAP message allows the agent 18 to dynamically inform the NMS 12 of significant events. In general, the GET, GET BULK, GET NEXT, and SET messages are sent by the NMS 12. The response and TRAP messages are provided by the agent 18, wherein the TRAP message is the only message that can be initiated by the agent 18.

Each agent 18 in the managed device 14 will manage various objects, wherein each object has one or more object instances that correspond to metrics, variables, or characteristics associated with the object. As noted, each object or object instance has a unique OID consisting of numbers that are separated by periods. An exemplary tree structure for a MIB 20 is illustrated in FIG. 2. The MIB 20 may associate each OID with a label, such as "organization" and various other object instances related to the object. The MIB 20 serves as a reference from which to assemble and interpret SNMP messages.

When an NMS 12, which contains MIB 20, wants to know the information associated with an object or object instance, a GET message is sent including the OID, from MIB 20, associated with the object or object instance being requested. The agent 18 in the managed device 14 will have a corresponding MIB 20, and will use the MIB 20 to identify the object or object instance associated with the OID. Information associated with the object or object instance is then provided back to the NMS 12 in a response message. In the illustrated tree structure, the first level of the OID includes objects CCITT, ISO, and ISO.CCITT, which are associated with OID indexes of 0, 1, and 2, respectively. Under the ISO object, ORGANIZATION, DoD, and INTERNET objects are provided, with OID references 4, 6, and 1, respectively. As such, the OID for the INTERNET object is 1.4.6.1.

Underneath the INTERNET object are DIRECTORY, MANAGEMENT (MGMT), EXPERIMENTAL, PRIVATE, and SECURITY objects, which are associated with OID references 1, 2, 3, 4, and 5, respectively. The OID for the DIRECTORY object is 1.4.6.1.1. Further, the PRIVATE object branches into ENTERPRISE, NORTEL, and OVERLOAD ALARM objects, which have OID references of 1, 8, and 20, respectively. As such, the OVERLOAD ALARM object has an OID of 1.4.6.1.4.1.8.20. The tree can continue with other objects and object instances.

Accordingly, the MIB 20 provides a data structure index corresponding to various objects. Each object will have one or more object instances associated therewith. When a single instance is associated with an object, only one piece of information is associated with the object. When multiple object instances are associated with an object, multiple pieces of information may be associated with an object. These additional object instances may be returned as a group in response to a request associated with that object, or the various instances may be associated with further OID references, wherein each piece of information can be obtained individually. When multiple object instances are associated with an object, corresponding information is associated with a table, such that an OID may correspond to an entire row in a table or a specific entry in a table.

Regardless of whether there are single object instances or multiple object instances provided in a table, existing MIB configurations require each of the managed devices 14 and the NMS 12, which are an associated group, to have the same and comprehensive MIB definitions. As such, if any new objects or object instances are to be gathered, monitored, or otherwise used in the group, a new MIB 20 must be created and provided to the NMS 12 and each of the managed devices 14. As networks evolve and the capabilities of managed devices 14 increase, the MIBs 20 for various systems must be updated frequently. Such updating is cumbersome and manually intensive, as the MIBs 20 are generally manually provisioned at each affected device.

Accordingly, there is a need for a technique by which managed devices 14 can add new objects or object instances without requiring a new MIB definition prior to or after adding the new information. There is a further need to allow the NMS 12 to recognize and retrieve information associated with new objects and object instances, which are added by one or more managed devices 14 without MIB updates.

SUMMARY OF THE INVENTION

The present invention provides a technique to define objects and object instances in a dynamically modifiable table within the confines of a management information base definition. With the invention, new objects and object instances may be added to the table without changing the management information base definition at a managed device or network management system. The managed device can change the table, yet allow the network management system to access the table using an associated object identifier. The network management system can systematically step through the various objects or object instances, which may correspond to rows and columns of the table, to detect additions or modifications to the table. The various objects and object instances in the table may be individually accessed, once identified, using a unique object identifier. The present invention allows additional metrics to be maintained by a managed device without requiring re-provisioning of the various managed devices and network management systems associated with a given managed information base definition.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 is a managed information base table according to one embodiment of the present invention.

FIG. 6 is a managed information base table according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
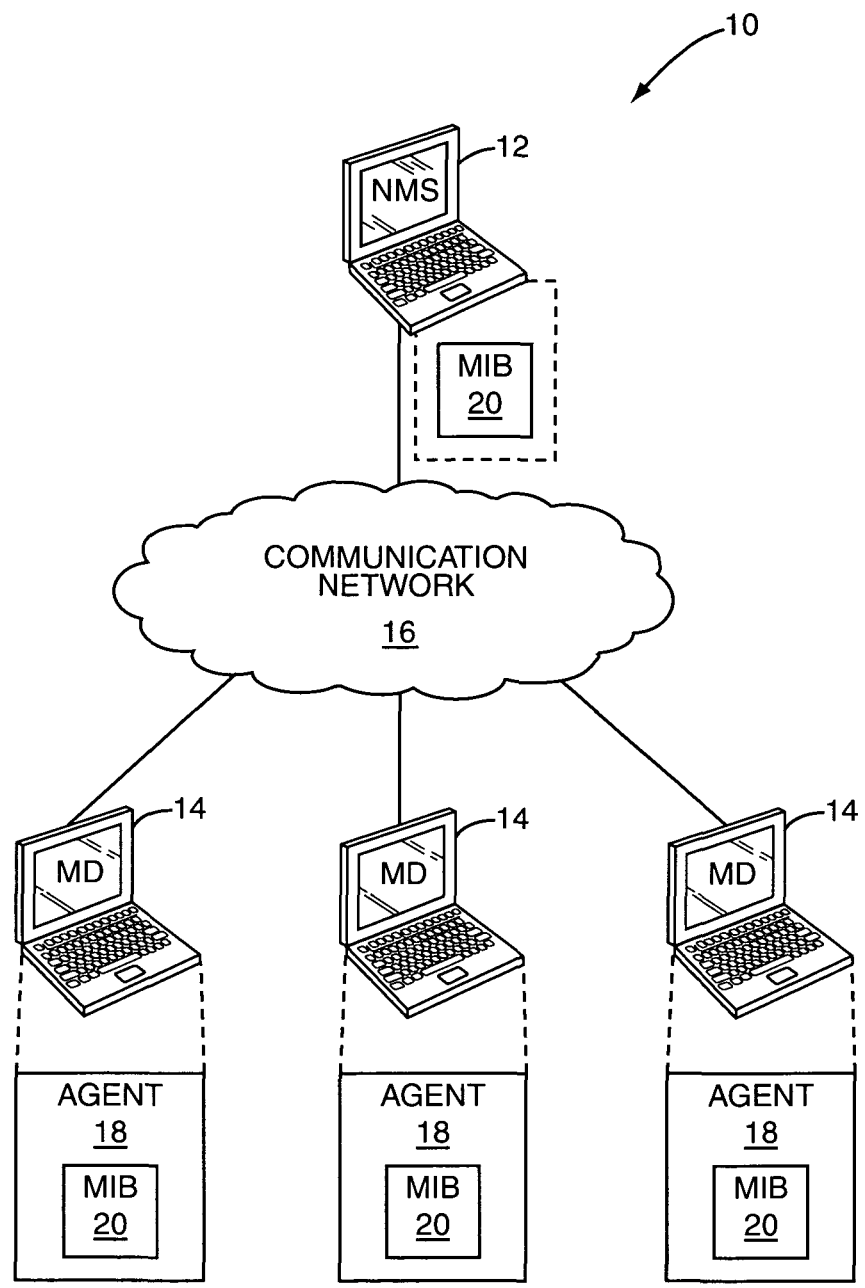
FIG. 1 is a block representation of an SNMP communication environment according to the prior art.
Figure 2:
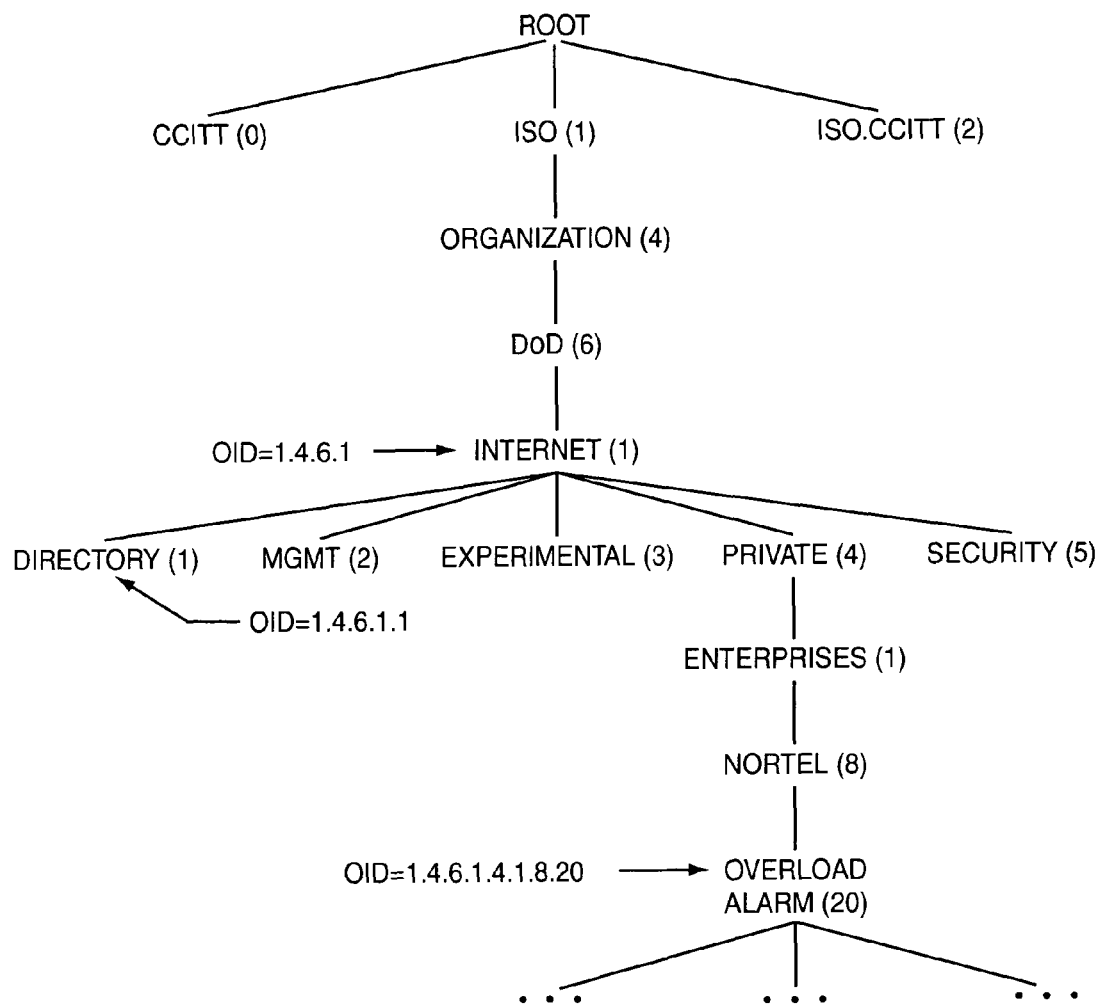
FIG. 2 is a diagram of a managed information base according to the prior art.

The present invention provides a MIB table, which corresponds to an object in an existing MIB definition. In essence, the object is a MIB table with various additional objects and object instances. Notably, additional objects and object instances may be added to the table without requiring modification to the MIB 20. Further, the network management system (NMS) 12 (FIG. 1) is able to retrieve all of the information, including new information, from the MIB table using existing SNMP messaging, without prior knowledge of the configuration or type of information provided in the table. The information provided in the table may take various forms, including read-only metrics or statistics. Further, the information may be of a type that is not normally supported by an SNMP MIB.

Figure 3:
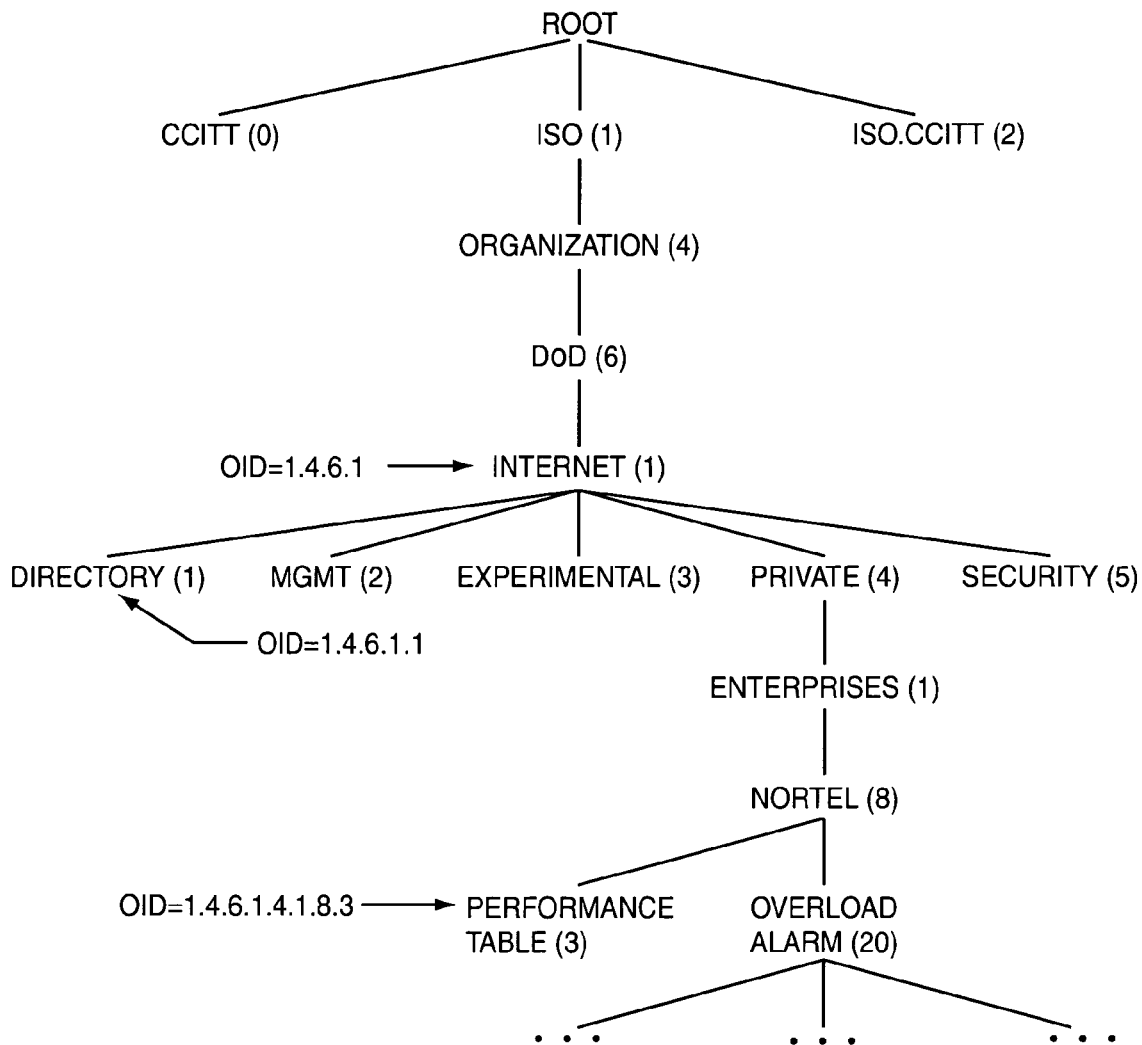
FIG. 3 is a diagram of a managed information base according to one embodiment of the present invention.

With reference to FIG. 3, an example tree architecture of a MIB 20 according to one embodiment of the present invention is illustrated. In this embodiment, assume a MIB table entitled PERFORMANCE TABLE resides under the NORTEL object, and has an OID reference of 3. The OID for the MIB table entitled PERFORMANCE TABLE is 1.4.6.1.4.1.8.3.

An exemplary MIB table according to one embodiment of the present invention is illustrated in FIG. 4. Each row in the table represents an object maintained by the performance table, and the columns represent object instances associated with an object. The object instances, as illustrated, may be an object index, a name, group, data type, source, and value information for a given object. The index simply refers to the OID reference, such that an OID may be used to identify the object or corresponding object instance. As illustrated, an OID reference for the performance table is 3, the four objects (entries) have OID references of 1, 2, 3, and 4, and the object instances: name, group, data type, source, and value have OID references of 1, 2, 3, 4, and 5, respectively. Thus, the OID for X, which represents information about the source of object 2 has an OID of 1.4.6.1.4.1.8.3.2.4.

In operation, the NMS 12 does not need to understand the configuration of the performance table (3). Instead, a GET or like message identifying the OID for the performance table should trigger a response with information bearing on the structure of the performance table or information in the performance table, depending on the configuration of the managed device 14. Once the NMS 12 recognizes that multiple objects and associated object instances are kept in the performance table, the various information for the various objects can be obtained through sequential GET, GET BULK, or GET NEXT messages. The NMS 12 can then step through each object or object instance until the end of the table is reached, wherein the managed device 14 will indicate that there are no further entries or object instances associated with the given entry. In essence, the NMS 12 is directed to the performance table, and is able to systematically step through the rows or columns of the table to obtain the information associated with the various objects or object instances, and during this process, identify the structure of the performance table.

Figure 5:
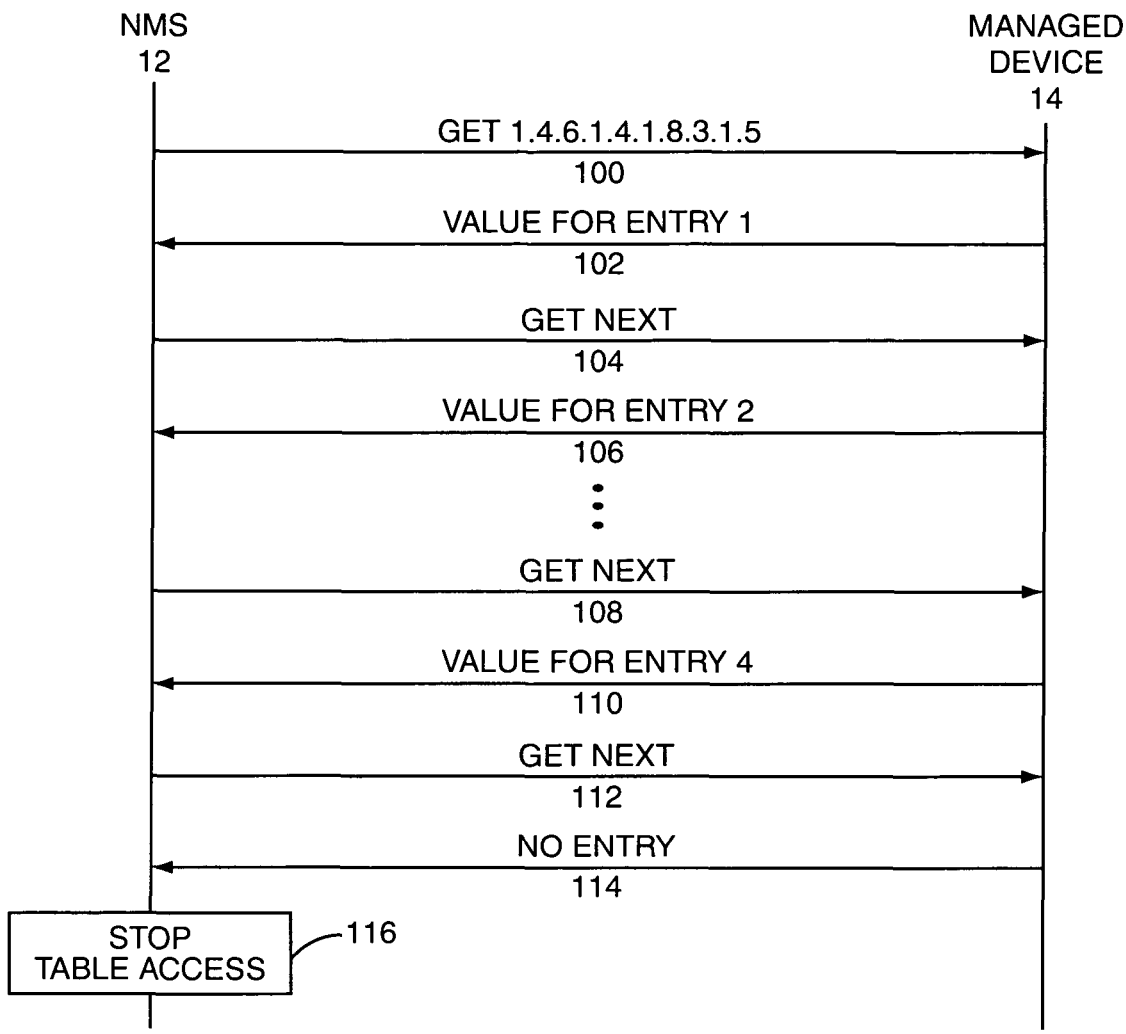
FIG. 5 is a communication flow diagram according to one embodiment of the present invention.

With reference to FIG. 5, a communication flow diagram is provided, wherein the NMS 12 recognizes that the performance table has at least one entry (object) and the value information (object instance) stored in association therewith. Assume that the NMS 12 wants to obtain the value information for each entry (object) in the performance table. As such, the NMS 12 will send a GET message including the OID 1.4.6.1.4.1.8.3.1.5, which corresponds to the value information for the first entry in the performance table (step 100). The managed device 14, under control of the agent 18, will send the value information for entry 1 back to the NMS 12 (step 102), which will process the value information as desired. To obtain value information for the next entry (2), the NMS 12 may send a GET NEXT message back to the managed device 14 (step 104), which will identify the value information for the second entry (2) and respond by providing the value information for the second entry to the NMS 12 (step 106). The process will continue wherein the NMS 12 will send a GET NEXT message for the third entry (not shown) and the fourth entry (step 108), and the managed device 14 will respond with the value information associated with the third entry (not shown) and fourth entry (step 110). At this point, the NMS 12 may not know that it is at the end of the performance table, or may need to check to see if additional entries (objects) have been added to the performance table. As such, another GET NEXT message is sent to the managed device 14 (step 112), wherein the managed device 14 will recognize that there are no further entries, and will send a like message back to the NMS 12 (step 114), which will recognize that all the value information for each of the entries in the performance table have been obtained and stop accessing the performance table (step 116). The NMS 12 retains this information for later reference.

At this point, assume that the agent 18 in the managed device 14 begins gathering information associated with two new functions, and that two new entries (objects) are added to the performance table (3). Assume that each entry has an associated name, group, data type, source, and value information in a fashion similar to that for the first four entries in the performance table. Accordingly, the value information for the sixth entry will have an OID of 1.4.6.1.4.1.8.3.6.5; however, the NMS 12 will not be aware of these new entries, as the MIB 20 is not updated to correspond to the new entries, or for any of the entries in the performance table in certain circumstances.

Figure 7:
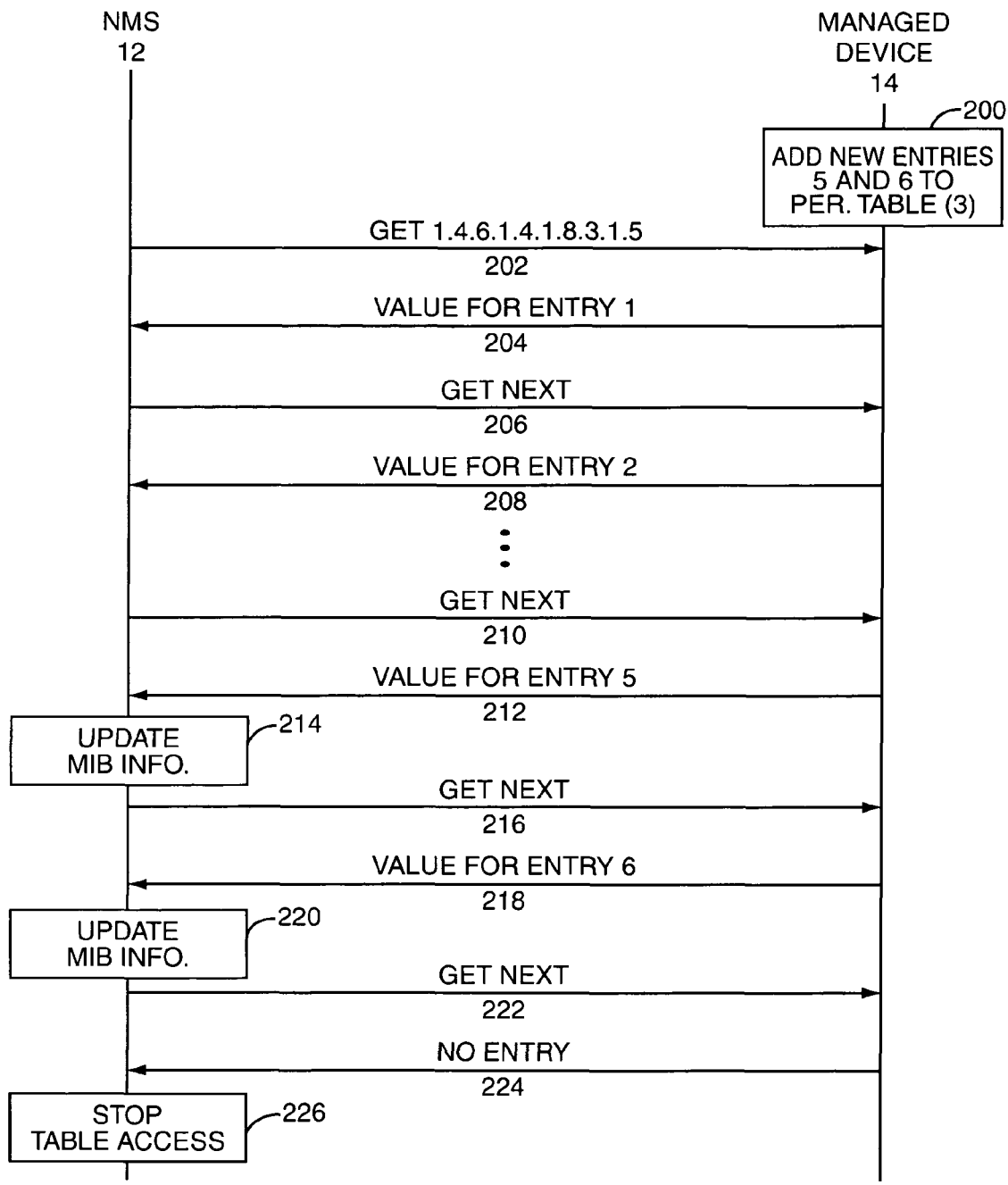
FIG. 7 is a communication flow diagram according to one embodiment of the present invention.

When the NMS 12 accesses the performance table again for any of the object instances associated with the various entries (objects), the NMS 12 may simply step through the table entries and the managed device 14 will respond by providing new information on new entries until all of the entries are accounted for. With reference to FIG. 7, a communication flow is illustrated where the value information for each of the entries in the performance table (3) is read by the NMS 12. The NMS 12 will recognize that the new entries have been added to the performance table (3) in this process by comparing the entries to what was previously collected.

Initially, the new entries 5 and 6 are added to the performance table (3) by the agent 18 of the managed device 14 (step 200). To obtain the value information for the entries in the performance table (3), the NMS 12 may send a GET message with the OID 1.4.6.1.4.1.8.3.1.5 to obtain the value information associated with the first entry (step 202). Under control of the agent 18, the managed device 14 will send the value information for entry 1 to the NMS 12 (step 204). To obtain the value for the next entry, entry 2, the NMS 12 may send a GET NEXT message to the managed device 14 (step 206), which will respond with the value information for entry 2 (step 208). If desired, this process may continue for each entry in the table. Even if the NMS 12 knew that there were originally four entries in the performance table, after obtaining the value information for entry 4 (not shown), the NMS 12 could send a GET NEXT message to the managed device 14 (step 210), which would obtain the value information for the new entry 5 and provide it back to the NMS 12 (step 212). The NMS 12 could update any MIB information retained (step 214) and send a GET NEXT message to the managed device 14 (step 216) to get any additional entries. The managed device 14 would then get the value information for new entry 6 and send the value information to the NMS 12 (step 218). Again, the MIB related information may be updated (step 220), and the NMS 12 will send another GET NEXT message to the managed device 14 (step 222). Since there are no further entries in the performance table, the managed device 14 would send a GET RESPONSE or other appropriate message indicating that there are no further entries (step 224), and the NMS 12 will stop accessing the performance table (step 226).

From the above, the present invention allows a preexisting MIB 20 to include an object or OID corresponding to a table, which may change in structure without requiring the MIB 20 to change by adding the new object. As objects or object instances within the table are added, removed, or changed, normal SNMP access techniques may be used to step through the table and discover new information or changes to old information. In addition to adding entries for a given object in a performance table, new object instances may be added. Further, other existing MIB tables (e.g. RMON2 UsrHistory Tables) may reference entries within the new MIB table. As such, significant flexibility may be provided in an SNMP environment without requiring the NMS 12 and the managed devices 14 managed by the NMS 12 to have their MIBs 20 updated as the managed devices 14 collect or otherwise keep track of new or different information.

Figure 8:
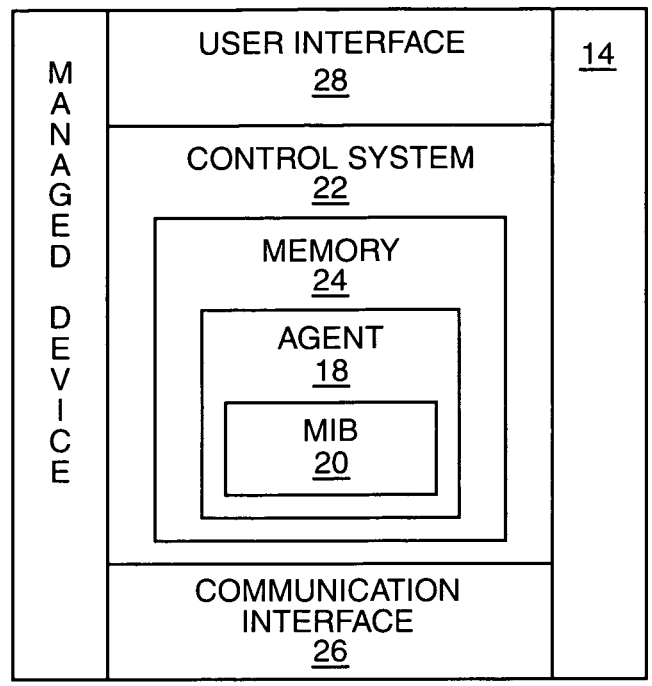
FIG. 8 is a block representation of a managed device according to one embodiment of the present invention.

With reference to FIG. 8, a block representation of a managed device 14 is provided. The managed device 14 may include a control system 22 having sufficient memory 24 to provide the agent 18 in order to operate as described above. A MIB 20 may be stored in the memory 24 in association with the agent 18. The control system 22 may also be associated with a communication interface 26 to facilitate communications with the NMS 12 or other network entities, as well as a user interface 28 to facilitate interaction with the user, if so desired or required.

Figure 9:
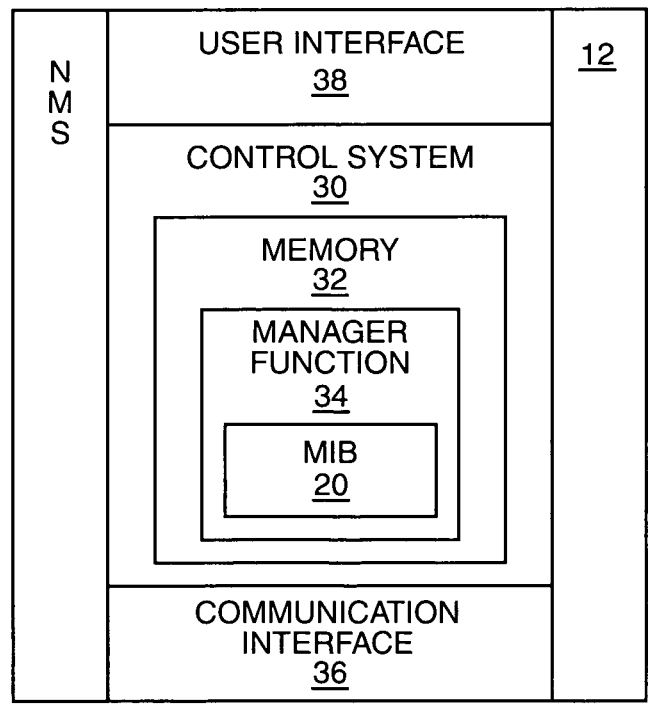
FIG. 9 is a block representation of a network management system according to one embodiment of the present invention.

FIG. 9 provides a block representation of an NMS 12 according to one embodiment of the present invention. The NMS 12 may include a control system 30 having sufficient memory 32 including a manager function 34 to control operation of the NMS 12 as described above. The memory 32 and the manager function 34 may support a MIB 20 corresponding to those supported by the agents 18 in the managed devices 14. The control system 30 may also include a communication interface 36 to facilitate communications with the various managed devices 14 and other network entities, as well as a user interface 38 to facilitate interaction with a human operator.

Those skilled in the art will recognize improvements and modifications to the preferred embodiments of the present invention. All such improvements and modifications are considered within the scope of the concepts disclosed herein and the claims that follow.

What is claimed is:

1. A method for operating a managed device in a simple network management protocol environment comprising:
   providing a managed information base definition, which is known by a network management system and comprises a position corresponding to a table and having a unique object identifier;
   creating the table to comprise information for objects and associated object instances, the objects and object instances not included in the managed information base definition; and
   providing access to the information by the network management system.

2. The method of claim 1 further comprising adding additional information associated with additional objects or associated object instances to the table and providing access to the additional information by the network management system without modifying the managed information base definition at the managed device or the network management system.

3. The method of claim 1 wherein providing access to the information and additional information comprises sequentially receiving requests for select information corresponding to the objects or associated object instances from the table and providing the select information until an end of a row or column in the table is reached, such that the table is fully accessible without modifying the managed information base definition.

4. The method of claim 1 wherein each object and associated object instance in the table is associated with an object identifier dependent on the object identifier for the table.

5. The method of claim 1 wherein multiple tables are associated with one another to provide historical information for the objects and object instances.

6. The method of claim 1 wherein the object instances are metrics obtained from the managed device.

7. A managed device for operating in a simple network management protocol environment comprising:
at least one communication interface; and
a control system associated with the at least one communication interface and adapted to:
provide a managed information base definition, which is known by a network management system and comprises a position corresponding to a table and having a unique object identifier,
create the table to comprise information for objects and associated object instances, the objects and object instances not included in the managed information base definition; and
provide access to the information by the network management system.

8. The managed device of claim 7 wherein the control system is further adapted to add additional information associated with additional objects or associated object instances to the table, and provide access to the additional information by the network management system without modifying the managed information base definition at the managed device or the network management system.

9. The managed device of claim 7 wherein to provide access to the information and additional information, the control system is further adapted to sequentially receive requests for select information corresponding to objects or associated object instances from the table and provide the select information until an end of a row or column in the table is reached, such that the table is fully accessible without modifying the managed information base definition.

10. The managed device of claim 7 wherein each object and associated object instance in the table is associated with an object identifier dependent on the object identifier for the table.

11. The managed device of claim 7 wherein multiple tables are associated with one another to provide historical information for the objects and object instances.

12. The managed device of claim 7 wherein the object instances are metrics obtained from the managed device.

13. A method for operating a network management system in a simple network management protocol system comprising:
providing a managed information base definition, which is known by a managed device and comprises a position corresponding to a table and having a unique object identifier;
sending a request to obtain information for objects and associated object instances within the table, the objects and object instances not included in the managed information base definition; and
receiving the information from the managed device.

14. The method of claim 13 wherein when the managed device adds additional information associated with additional objects or associated object instances to the table, the additional information is accessible without modifying the managed information base definition at the managed device or the network management system.

15. The method of claim 13 wherein access to the information and additional information comprises sequentially sending requests for select information corresponding to objects or associated object instances from the table, and receiving the select information until an end of a row or column in the table is reached, such that the table is fully accessible without modifying the managed information base definition.

16. The method of claim 13 wherein each object and associated object instance in the table is associated with an object identifier dependent on the object identifier for the table.

17. The method of claim 13 wherein multiple tables are associated with one another to provide historical information for the objects and object instances.

18. The method of claim 13 wherein the object instances are metrics obtained from the managed device.

* * * * *